Dec. 2, 1941.  E. A. GLYNN  2,264,633
TIRE REMOVING EQUIPMENT
Filed Oct. 4, 1939
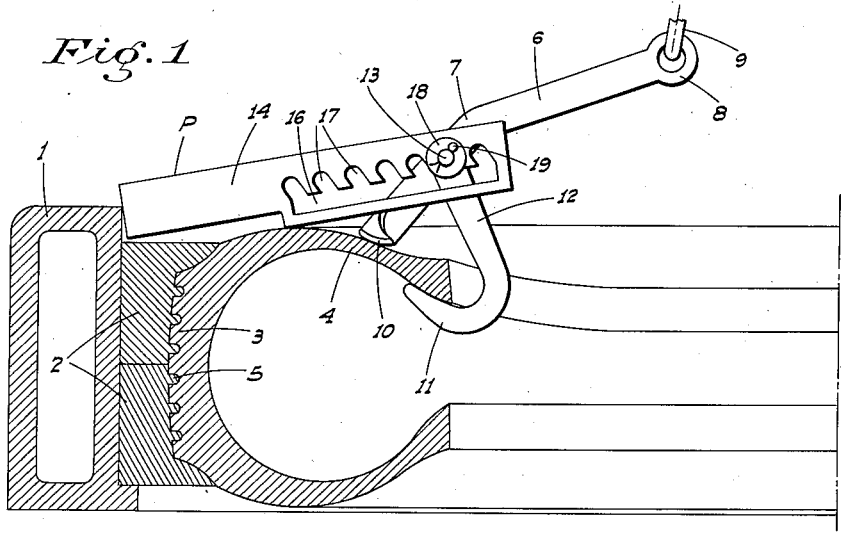
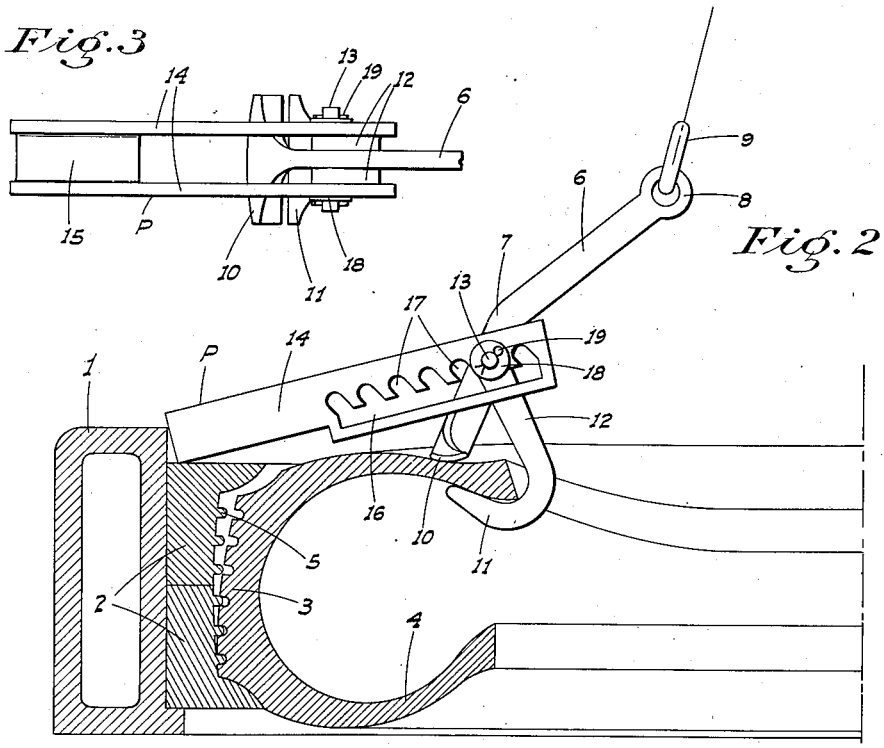
INVENTOR.
E. A. Glynn
BY
ATTORNEY Patented Dec. 2, 1941

2,264,633

UNITED STATES PATENT OFFICE 2,264,633

TIRE REMOVING EQUIPMENT

Edwin A. Glynn, Lodi, Calif., assignor to Super Mold Corporation of California, a corporation of California Application October 4, 1939, Serial No. 297,835

6 Claims. (Cl. 18—2)

This invention relates to equipment for removing a tire from a horizontal full-circle retreading or recapping mold, and particularly represents an improved addition to the device for the purpose shown in my copending application Serial No. 258,234, filed February 24, 1939.

Said device comprises a special form of grapple depending from a hoist cable above the mold and arranged to clampingly engage the horizontally disposed tire at the upper run bead. The line of pull on the cable is so disposed that the grapple tends to pull the upper side of the tire radially in as well as up, so as to positively disengage the tire tread from the matrix.

In large tires particularly however, the depth of the tread design is such that the above device did not pull the tire radially in sufficient to properly disengage the tread from the matrix before lifting the tire, and there was a tendency for the tread design on the tire to be marred.

The principal object of the present invention, therefore, is to remedy this defect by providing equipment which includes the grapple so that when an upward pull is applied to the grapple, the tire engaging portion of the latter will be positively pulled radially inward a sufficient distance to cause the tire tread to clear the matrix design.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a fragmentary radial section of a mold and tire therein, showing the tire removing equipment as initially applied thereto.

Figure 2 is a similar view showing the position of the equipment and tire after the initial pull of the cable on the grapple.

Figure 3 is a top plan view of the equipment.

Referring now more particularly to the characters of reference on the drawing, the mold with which the equipment is used comprises a horizontal full-circle mold body 1 in which the tread matrix sections 2 are mounted below the top of the body; these sections engaging the tread portion 3 of a tire 4 and having tread design elements 5 therein which form a corresponding design in the tread rubber of the tire.

The grapple as shown in said copending application and which also forms part of the present equipment, comprises a shank 6 formed intermediate its ends with an acute-angle bend 7 and provided at its upper end with an eye 8 to which the hook or ring 9 of a hoist cable is attached. At its lower end the shank is formed with a crosshead 10 adapted to engage the upper surface of the uppermost side of the tire in the mold near the rim-bead thereof. A deep-throat hook 11 to cooperate with the crosshead and engage the under or inner surface of said upper side of the tire is provided with a shank 12 which is pivotally connected by a loose cross pin 13 with the shank 6 between the bend 7 and said crosshead. The crosshead and tire engaging portion of the hook are so related that when the shank 6 is pulled up, the hook and crosshead engage the tire with an increasing grip or pressure.

The remaining part P of the equipment, which cooperates with the grapple, comprises, in unitary form, a pair of rigid spaced bars 14 set on edge vertically and connected at one end by a web 15. The bars beyond the web are formed with longitudinal closed slots 16 having a series of notches 17 cut up from the upper edge of the slots. The depth of the slots below the notches and the width and depth of the latter are sufficient to freely receive the cross pin 13 of the grapple. The length of the part P is such that it will extend radially in from the inner circumference of the mold body to a point beyond the beads of any tire which may be placed in the mold.

The grapple is mounted in adjustable relation on the part P by first withdrawing pin 13, placing the grapple shanks between bars 14 with the upper end portion of shank 6 facing away from the connected end of the bars, and reinserting the pin. Washers 18 are then placed over the pin outwardly of the bars 14, and cotter pins 19 are inserted through the crosspin outwardly of the washers.

In operation, with the grapple and part P thus assembled, the latter is disposed radially of the mold with its connected end abutted against the inner circumference of the mold body above the matrix sections as shown. The grapple is then adjusted lengthwise of the bars according to the size of the tire and engaged with the latter, and the crosspin 13 is then engaged with the adjacent notches 17 so that the upper portion of the shank, beyond bend 7, is substantially horizontal as shown in Fig. 1.

With the equipment thus positioned an initial upward pull on shank 6 will cause the crosshead portion of the shank below pin 13, and consequently the hook as well, to be swung in a radially inward direction relative to the mold, turning about the crosspin as an axis. Since the crosspin cannot move radially out due to the rigid part P with which the crosspin is engaged, the lower and effective portion of the grapple will actually move radially inward of the mold before any appreciable lifting of said portion of the grapple is had. As a result, the tread portion of the tire is pulled radially and away from the matrix a sufficient distance to clear the tread rubber from the matrix design as shown in Fig. 2. Of course, as soon as the grapple moves upwardly as a whole any appreciable distance, the part P moves away from the mold and merely hangs from the pin 13, but it has then served its purpose.

During the initial movement of the grapple however, the part P forms a fulcrum means for the grapple pivot, holding the latter against radially outward movement relative to the mold and tire.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Equipment to remove a tire from the surrounding matrix of a horizontal mold comprising a grapple adapted to extend radially inward of and to clampingly engage the tire at a point adjacent its uppermost bead, said grapple including a shank having a bend intermediate its ends and the outer portion of which is disposed so as to be substantially horizontal, a crosspin mounted on the shank adjacent the bend and a member comprising a pair of spaced bars adapted to extend radially of the mold and to engage the same to prevent radially outward movement of the member, the shank projecting between the bars and the latter having longitudinal slots through which the crosspin slidably projects; a row of pin notches being cut in the bars along the upper edge of the slots.

2. Equipment to remove a tire from a horizontal mold comprising a rigid bar adapted to extend radially of the mold and at its outer end to engage the mold to prevent radial outward movement of the bar, and a grapple mounted in connection with the bar and including an upstanding shank and means pivotally connecting the shank intermediate its ends on the bar; said shank at its lower end being adapted to engage a tire in the mold at a point adjacent its uppermost bead, and the shank above the pivot extending in a direction radially inward of the mold and adapted at its upper end for connection to a pull-up means.

3. Equipment to remove a tire from a mold comprising a rigid bar adapted to extend radially inward of and at one end to engage the mold, and a grapple including a shank adapted at one end to engage a tire in the mold and at the other end to be pulled in a direction substantially axially of the mold and a common means to pivotally connect the shank intermediate its ends on the bar at different selected points in the length of the latter and to maintain the bar and shank permanently coupled together.

4. Equipment to remove a tire from a mold comprising a rigid bar adapted to extend radially inward of and at one end to engage the mold, and a grapple including a shank adapted at one end to engage a tire in the mold and at the other end to be pulled in a direction substantially axially of the mold and a hook adapted to cooperate with the shank at said one end thereof; and a pivot pin connecting the hook, shank and bar as a unit.

5. Equipment to remove a tire from a mold comprising a rigid bar adapted to extend radially inward of and at its outer end to engage the mold, a grapple mounted on the bar, and including a hook facing radially outward of the mold to receive and grip a tire in the mold adjacent a bead thereof, and a member formed with the grapple adapted to be pulled in a predetermined direction and arranged so that upon such pull, a pressure is exerted on the tire engaged by the grapple in a direction radially inward of the mold.

6. Equipment to remove a tire from a mold comprising a rigid bar adapted to extend radially inward of and at its outer end to engage the mold, a grapple mounted on the bar, and including a shank extending in a direction generally axially of the mold and pivoted intermediate its ends on the bar, said shank at one end being adapted to bear against the outer surface of a tire in the mold adjacent one bead thereof and at the other end being adapted to be pulled in a predetermined direction, and a hook flexibly mounted on the shank to engage the inner surface of the tire adjacent said bead and disposed to cooperate with said other end of the shank to grip the tire upon such pull on the shank.

EDWIN A. GLYNN.